United States Patent [19]

Mizobe et al.

[11] 3,987,140

[45] Oct. 19, 1976

[54] METHOD OF PREPARING POLYVINYL ALCOHOL FIBERS HAVING IMPROVED PROPERTIES

[75] Inventors: Akio Mizobe; Tomoo Saheki; Shigekazu Kobayashi, all of Kurashiki, Japan

[73] Assignee: Kuraray Co., Ltd., Kurashiki, Japan

[22] Filed: Apr. 11, 1973

[21] Appl. No.: 350,151

[30] Foreign Application Priority Data

Apr. 11, 1972 Japan.............................. 47-36262
June 23, 1972 Japan.............................. 47-63504

[52] U.S. Cl................................ 264/170; 264/185
[51] Int. Cl.²........................................... D01D 1/10
[58] Field of Search............... 260/45.85 N, 45.7 P, 260/29.6 B, 29.6 BM, 29.6 NR; 264/185, 170, 169

[56] References Cited

UNITED STATES PATENTS

| | | | |
|---|---|---|---|
| 2,345,570 | 4/1944 | Bley.................................. | 264/170 |
| 2,878,208 | 3/1959 | Holmes et al............... | 260/45.85 N |
| 2,888,318 | 5/1959 | Parker............................... | 264/170 |
| 2,962,476 | 11/1960 | Verburg...................... | 260/45.85 N |
| 3,063,787 | 11/1962 | Rynkiewicz et al............. | 264/290 R |
| 3,660,556 | 5/1972 | Ashikaga et al.................... | 264/185 |
| 3,776,994 | 12/1973 | Yoshioka et al..................... | 264/185 |

FOREIGN PATENTS OR APPLICATIONS 37-10590  8/1962  Japan................................ 264/185

OTHER PUBLICATIONS

Hackh's Chemical Dictionary, Fourth Ed., p. 605.

*Primary Examiner*—Jay H. Woo
*Attorney, Agent, or Firm*—Bacon & Thomas

[57] ABSTRACT

Disclosed is a method for preparing polyvinyl alcohol fibers which comprises spinning an aqueous solution of polyvinyl alcohol containing boric acid or a borate and from about 0.01–5 weight per cent based on said polyvinyl alcohol of an additive comprising an amino acid, an amine, salicylic acid and derivatives thereof or a derivative of pyridine into an alkaline coagulation bath, and subsequently treating the resultant spun fiber by roller drawing, neutralizing with acid, wet hot drawing, washing with water, drying and dry hot drawing.

8 Claims, No Drawings

METHOD OF PREPARING POLYVINYL ALCOHOL FIBERS HAVING IMPROVED PROPERTIES

BACKGROUND OF THE INVENTION

The present invention relates to a wet spinning process for obtaining polyvinyl alcohol (hereinafter referred to as PVA) fiber containing boric acid or a borate, and more especially to a very stable spinning process for producing a PVA fiber of high tenacity and high modulus.

The process of spinning a PVA solution containing boric acid or a borate into an alkaline coagulation bath to produce PVA fiber has long been known. For example, the specifications of Japanese Patent Publications No. 8918/1956 and No. 2061/1959 disclose the process of spinning a PVA spinning solution containing boric acid or a borate into an alkaline coagulation bath containing different salts.

It is supposed that in these processes the PVA spinning solution may form a fiber by the gelation reaction with the alkaline component, by the dehydrating coagulation reaction with the salts of the coagulation bath and further by the crosslinking reaction with boric acid. Since these reactions proceed simultaneously, the mechanism of the spinning reaction is so delicate that it is affected by slight changes in the spinning conditions and becomes very unstable. Accordingly, the quality of the thus obtained products fluctuates notably and the tendency for the products to degenerate with the lapse of time is extremely apparent and is one of the largest problems associated with this process. Spinning methods for PVA fibers of the above-mentioned type have long been known, and a sufficient number of basic studies have been reported to enable production of fibers of relatively high quality, but this technique has not yet been applied practically to industrial production, evidently because of the above-mentioned unsteadiness of spinning and the unstable quality.

The present inventors, after researching the causes of such unsteadiness of spinning and instability also taking into consideration the change in the quality of the fiber with the lapse of time, have found that these deficiencies are a function of the metal deposit on the backside of the spinning nozzle (on the side of the spinning solution) and of the deposit of scale around the nozzle orifice of the front side of the spinning nozzle (on the side of the coagulation bath).

Since the spinning nozzle for a wet process is generally made of an alloy of gold with platinum, the noble metal when coming in contact with some non-noble metal is apt to create a galvanic cell and itself become a cathode while making the non-noble metal an anode. The spinning solution contains a fair amount of metal ions derived from the water solvent or from erosion of the apparatus, which metal ions appear to have been deposited on the nozzle acting as a cathode. According to the result of our analysis, the deposited metal consists principally of copper and subsidiary components such as iron.

According to the results of our analysis, it has been found that the scale deposited around the nozzle orifice contains iron and calcium compounds. This fact suggests that the metal ions contained in the spinning solution would become insoluble compounds to deposit as the scale around the nozzle orifice.

SUMMARY OF THE INVENTION

In accordance with the present invention there has been provided a process for producing PVA fibers having an excellent quality and containing boric acid or a borate, which comprises admixing 0.01 – 5% by weight based on the PVA weight of a compound selected from the group consisting of an amino acid, an amine, salicylic acid or a derivative thereof and a derivative of pyridine (hereinafter abbreviated as the additive) with the aqueous polyvinyl alcohol solution containing boric acid or a borate and then spinning the solution into an alkaline coagulation bath to form filaments. When 0.01 – 5% by weight of the additive based on the polyvinyl alcohol is admixed with the spinning solution according to the process of the present invention, the electrodeposition of metals and the formation of scale are completely eliminated to ensure a very stable spinning process and also prevent the degeneration of the fiber quality with lapse of time.

DETAILED DESCRIPTION OF THE INVENTION

The present inventors have previously applied for patents relating to a method of admixing aminopolycarboxylic acid and condensed phosphoric acid to the coagulation bath (Ser. No. 202,384 filed Nov. 26, 1971). Although the above methods were capable of preventing the formation of scale, they were not effective for preventing the electrodeposition of metal on the backside of the spinning nozzle and they failed to assure a complete stabilization of the spinning process. The present invention overcomes this limitation and assures a very high stability of the spinning process. In comparison with the conventional processes in which no additive is added to the spinning solution and the spinning process is gradually worsened with the lapse of time to reduce the product quality and curtail the life of the nozzle to five days, the present invention enables a prolonged nozzle life of more than one month and also prevents the degeneration of the product quality.

When the additive is incorporated only in the spinning bath, the spinning process is maintained stable for about 15 - 20 days, but thereafter the spinning is worsened as electrodeposition occurs on the backside of the nozzle.

It is believed that the effect of incorporating the additive into the spinning solution according to the present invention is achieved because the metal ions in the spinning solution combine with the additive to form chelate compounds and thereby change the redox potential thereof to interrupt the electrodeposition and, thus prevent the formation of such compounds into scale or alternatively immediately dissolve any already formed scale by the action of the additive.

Furthermore it has been discovered that the fiber produced according to the present invention possesses qualities such as tenacity and initial modulus better than the products obtained from a spinning solution not containing the additives.

The reasons why fibers of improved quality are obtainable according to the present invention are not well known yet, but it may be suggested that the additive admixed with the PVA spinning solution containing boric acid or a borate affects directly or indirectly the coagulation of said spinning solution caused by dehydration or gelation and assures that the PVA fibers have a compact and fine microstructure.

It is beyond our expectation that the effect obtained by the present invention has improved not only the spinnability but also the quality of the thus obtained PVA fibers. This result was totally unexpected in view of the conventional process for preparing PVA fibers containing boric acid.

The additives used in the process of the present invention may be the compounds having a solubility in the spinning solution of from about 0.01 – 5% by weight based on the PVA.

Among the amino acids contemplated for use in the present invention, aminopolycarboxylic acids have the greatest effect. Suitable examples of aminopolycarboxylic acids include ethylenediamine-tetraacetic acid and the sodium and potassium salts thereof (hereinafter sodium and potassium aminopolycarboxylates are referred to as the salts thereof), nitrilotriacetic acid and the salts thereof, trimethylene diamine-tetraacetic acid and the salts thereof, methylamine-diacetic acid and the salts thereof, and N-cyclohexylethylenediamine-triacetic acid and the salts thereof.

Amines used in the present invention include ethylene diamine, N-methylethylene diamine, N-n-propylethylene diamine, N,N'-dimethylethylene diamine, 1,2-diaminopropane, trimethylene diamine, 1,2-diaminocyclohexane, 1,2,3-triaminopropane, 1,3-diamino-2-aminomethylpropane, diethylenetriamine, triethylenetetramine, 2-hydroxyethylamine, 2-mercapto ethylamine and bis(2-aminoethyl) sulfide. Salicylic acid and derivatives thereof include salicylic acid and 5-sulfosalicylic acid. Derivatives of pyridine include 2-aminomethyl pyridine, pyridine-2-carboxylic acid, pyridine-2,6-dicarboxylic acid, pyridoxamine, piperizine and piperizine-2,6-dicarboxylic acid.

The quantity of said additive to be admixed to the spinning solution should be within the range of about 0.01 – 5% by weight based on the PVA, and preferably within the range of about 0.1 – 1.0% by weight. A content less than 0.01% by weight may be less effective and a content larger than 5% may be undesirable because of an adverse effect on the coagulation.

No particular means are necessary to admix the additive, and it may simply be dissolved in the required quantity at the time of preparing the spinning solution.

The PVA employable in the present invention should have a polymerization degree greater than 500 and a degree of saponification greater than 95% and preferably greater than 99 mol per cent, while the aqueous spinning solution should have a PVA concentration of from about 10 – 30% by weight and should contain from about 0.5 – 5% by weight of boric acid or a borate based on the PVA. The solution should preferably have a pH value of from about 3.5 to 7.

The above-described PVA spinning solution can be spun by a usual wet spinning method. The coagulation bath should be an aqueous solution containing about 5 – 200 g/l of caustic alkali and 100 g/l to the saturating concentration of a dehydration salt. Examples of employable caustic alkalis are sodium hydroxide and potassium hydroxide, while examples of dehydration salts include sodium sulfate, ammonium sulfate and sodium carbonate. The spun fiber may be conventionally treated by neutralization with an acid, washing with water, drying, drawing, heat-treatment and acetalization.

The PVA fiber obtained by the process of the present invention has excellent tenacity and initial modulus, particularly at higher temperature, and is useful as an industrial material for tires, belts and other materials to be employed under severe conditions.

Now the present invention will be described in detail with reference to several specific embodiments thereof. The dry breaking tenacity and initial modulus as shown in these examples are determined as follows:

Dry breaking tenacity: This is a value of a sample fiber 20 cm long being twisted 8 turns/10 cm length and then dried for 3 hours at 105° C., measured in accordance with the Japanese Industrial Standard L 1070 by a tensile testing machine (constant rate of extension type) in which an elastic film (Lycra film made by du Pont Company) is stuck to the jaw face of a chuck, and drawing the sample at a drawing speed of 10 cm per minute.

Initial modulus: This is a value measured on the basis of the stress-strain curve obtained by measuring the foregoing dry breaking tenacity in accordance with Japanese Industrial Standard L 1073. when the measurement is made at normal temperature, it is made in a room maintained at 20° C. and when the measurement is made at high temperatures, it is made by setting an electric heater so that the upper and lower chucks and the sample are maintained at 120° C.

EXAMPLE 1

50 kg of PVA having a polymerization degree of 2,200 and a saponification degree of 98.5 mole per cent were dissolved in water to form an aqueous solution containing 13% PVA to which was then added 1 kg of boric acid (2% by weight on the basis of the PVA) and 0.05 kg of ethylenediamine-tetraacetic acid (0.1% by weight based on the PVA) and there was further added acetic acid to adjust the pH to 4.5.

The thus obtained spinning solution was spun into a coagulation bath containing 100 g/l of NaOH and 150 g/l of $Na_2SO_4$ through a nozzle having 1000 orifices of 0.06 mm diameter at a extrusion rate of 150 g/min and was removed from the bath at a rate of 8 m/min.

Subsequently, the spun filament was drawn by 100% with rollers and the sodium hydroxide adhered to the fiber was neutralized with sulfuric acid. Then the resultant fiber was wet hot drawn at a ratio of 100%, washed with water, dried, dry hot drawn at a ratio of 250%, heat treated, taken up and thereafter the properties of the fiber were measured.

CONTROL EXAMPLES A AND B

Control Example A; Aside from the fact that no ethylenediamine tetraacetic acid was added to the spinning solution, the treatment was essentially the same as that of Example 1.

Control Example B; Aside from the fact that ethylenediamine tetraacetic acid of $3.4 \times 10^{-3}$ mol/l was added to the coagulation bath instead of to the spinning solution, the treatment was essentially the same as that of Example 1.

Table I shows the results of Example 1 and Control Examples A and B. It is evident from this table that ethylenediamine tetraacetic acid added to the spinning solution offered most excellent effects.

Table I

|  | Example 1 | Control Example B | Control Example A |
|---|---|---|---|
| Spinnability | Stable beyond 30 days | Stable for 15 days | Decreased from 5th day |
| Fiber-breaking in drawing (times/100 kg) | 0.33 | 0.52 | 6.3 |
| Electrodeposition of metal on the backside of nozzle | none | yes | yes |
| Dry breaking tenacity at room temperature (g/d) | | | |
| after 1 day | 10.8 | 10.7 | 9.8 |
| after 4 days | 10.8 | 10.8 | 9.3 |
| after 7 days | 10.9 | 10.5 | — |
| after 15 days | 11.0 | 10.5 | — |
| after 30 days | 10.8 | 10.7 | — |
| Initial modulus at room temperature (g/d) | 280 | 275 | 230 |
| at high temperature | 140 | 132 | 105 |

EXAMPLES 2 – 4 AND CONTROL EXAMPLES C AND D

The treatment of Example 1 was repeated except that nitrilotriacetic acid was employed instead of ethylenediaminetetraacetic acid. The quantity of nitrilotriacetic acid added was varied each time as shown in Table III. In control Example C, the spinning solution originally contained a great amount of bubbles, which were difficult to remove and provided an abnormally difficult spinnability. The results are shown in Table II.

spun fiber was drawn with rollers at a ratio of 100%, and thereafter, NaOH adhered to the fiber was neutralized with sulfuric acid. Then the resulting fiber was wet hot drawn at a ratio of 100%, washed with water, dried, dry hot drawn at a ratio of 250%, heat-treated, taken up and thereafter the properties of the fiber were measured.

CONTROL EXAMPLES E AND F

Control Example E; Aside from the fact that no N-methylethylenediamine was added to the spinning solu- Table II

|  | Example No. | | | Control Example | |
|---|---|---|---|---|---|
|  | 2 | 3 | 4 | C | D |
| Nitrilotriacetic acid (% by weight based on PVA) | 2 | 0.5 | 0.05 | 8 | 0.005 |
| Spinnability | Stable for 30 days | Stable for 30 days | Stable for 30 days | Decreased from 3rd day | Decreased from 10th day |
| Fiber-breaking in drawing (times/100 kg) | 0.75 | 0.28 | 0.65 | 5.8 | 3.3 |
| Electrodeposition of metal on the backside of nozzle | none | none | none | none | a little |
| Dry breaking tenacity at room temperature (g/d) | | | | | |
| after 1 day | 10.8 | 11.5 | 10.7 | 10.5 | 10.2 |
| after 4 days | 10.9 | 11.4 | 10.9 | — | 9.8 |
| after 7 days | 10.8 | 11.6 | 10.9 | — | 10.1 |
| after 10 days | 10.8 | 11.2 | 10.7 | — | 9.7 |
| after 15 days | 11.0 | 11.4 | 11.0 | — | — |
| Initial modulus (g/d) | | | | | |
| at room temperature | 275 | 285 | 270 | 255 | 250 |
| at high temperature | 131 | 145 | 135 | 122 | 120 |

EXAMPLE 5

50 kg of PVA having a degree of polymerization of 2400 and a saponification degree of 98.5 mole per cent were dissolved in water to obtain an aqueous solution containing 13 weight per cent PVA, and a spinning solution was prepared from the aqueous solution by adding 1 kg of boric acid (2 weight per cent based on PVA), 0.05 kg of N-methylethylenediamine and acetic acid to adjust the pH to 4.5. This spinning solution was spun into a coagulation bath containing 100 g/l of NaOH and 150 g/l of $Na_2SO_4$ through a nozzle having 1000 orifices each 0.06 mm in diameter at an extrusion rate of 150 g/min. and the resultant fiber was removed from the bath at a rate of 8 m/min. Subsequently, the tion, the treatment was essentially the same as that of Example 5.

Control Example F; Aside from the fact that N-methylethylenediamine of $3.4 \times 10^{-3}$ mole/l was added to the coagulation bath instead of to the spinning solution, the treatment was essentially the same as that of Example 5.

The results of Example 5 and control examples E and F are shown in Table III.

TABLE III

|  | Example 5 | Control Ex. E | Control Ex. F |
|---|---|---|---|
| Spinnability | Stable beyond 30 days | Decreased from 5th day | Stable for 15 days |
| Fiber breaking | | | |

TABLE III-continued

|  | Example 5 | Control Ex. E | Control Ex. F |
|---|---|---|---|
| in drawing (times/100 kg) | 0.31 | 6.3 | 0.72 |
| Electrodeposition of metal on backside of nozzle | none | yes | yes |
| Dry breaking tenacity (g/d) | | | |
| 1 day | 10.7 | 9.8 | 10.6 |
| 4 | 10.9 | 9.3 | 10.8 |
| 7 | 10.9 | — | 10.4 |
| 15 | 11.0 | — | 10.4 |
| 30 | 10.8 | — | 10.4 |

EXAMPLE 6 AND CONTROL EXAMPLE G 50 kg of PVA having a degree of polymerization of 1700 and a degree of saponification of 98.5% were dissolved in water to obtain an aqueous solution containing 18 weight per cent of PVA and a spinning solution was prepared from the aqueous solution by adding 0.75 kg of boric acid (1.5 weight per cent based on PVA), 0.25 kg of salicylic acid (0.5 weight per cent based on PVA) and acetic acid to adjust the pH to 5. The treatment otherwise was essentially the same as that of Example 5.

Control Example G; Aside from the fact that no salicylic acid was added to the spinning solution, the treatment was essentially the same as that of Example 6. The results of Example 6 and Control Example G are shown in Table IV.

Table IV

|  | Example 6 | Control Example G |
|---|---|---|
| Spinnability | Stable beyond 30 days | Decreased from 7th day |
| Fiber-breaking in drawing (times/100 kg) | 0.50 | 4.2 |
| Electrodeposition of metal on backside of nozzle | none | yes |
| Dry breaking tenacity at room temperature (g/d) | | |
| 1st day | 10.8 | 10.0 |
| 4th day | 11.0 | 9.5 |
| 10th day | 11.0 | — |
| 15th day | 10.8 | — |
| 30th day | 10.8 | — |
| Initial modulus (g/d) | | |
| at room temperature | 280 | 240 |
| at high temperature | 140 | 110 |

EXAMPLES 7 – 9 AND CONTROL EXAMPLES H AND I

Instead of using N-methylethylenediamine, triethylene tetramine was added to the spinning solution. The quantity of the additive was varied as shown in Table V. The treatments were otherwise essentially the same as that of Example 5. The results are shown in Table V.

Table V

|  | Example No. | | | Control Example | |
|---|---|---|---|---|---|
|  | 7 | 8 | 9 | H | I |
| Triethylene tetramine (weight %/PVA) | 2 | 0.5 | 0.05 | 8 | 0.005 |
| Spinnability | Stable beyond 30 days | same | same | Decreased from 3rd day | Decreased from 10th day |
| Fiber-breaking in drawing (times/100 kg) | 0.80 | 0.30 | 0.75 | 6.5 | 2.3 |
| Electrodeposition of metal on backside of nozzle | none | none | none | none | a little |
| Dry breaking tenacity at room temperature (g/d) | | | | | |
| 1st day | 10.7 | 11.3 | 10.6 | 10.2 | 10.1 |
| 4th day | 10.7 | 11.3 | 10.7 | — | 10.0 |
| 7th day | 10.8 | 11.5 | 10.9 | — | 9.9 |
| 10th day | 10.7 | 11.1 | 10.9 | — | 9.8 |
| 15th day | 10.9 | 11.3 | 11.0 | — | — |
| Initial modulus (g/d) | | | | | |
| at room temperature | 270 | 281 | 272 | 250 | 245 |
| at high temperature | 131 | 148 | 135 | 122 | 120 |

EXAMPLE 10

Instead of the N-methylethylenediamine used in Example 5, 2-aminomethyl pyridine was added to the spinning solution in the same quantity as that of Example 5. The treatment was essentially the same as that of Example 5. The results obtained are shown in Table VI.

While the present invention has been described and pointed out with reference to certain specific embodiments thereof, it is to be understood that the scope of proprietary rights attendant thereto are not to be limited except by the following claims.

Table VI

| | Example 10 |
|---|---|
| Spinnability | Stable beyond 30 days |
| Fiber-breaking in drawing (times/100 kg) | 0.25 |
| Electrodeposition of metal on backside of nozzle | none |
| Dry breaking tenacity at room temperature (g/d) | |
| 1st day | 10.9 |
| 4th day | 10.6 |
| 7th day | 10.4 |
| 15th day | 11.0 |
| 30th day | 10.8 |
| Initial modulus (g/d) | |
| at room temperature | 280 |
| at high temperature | 138 |

What is claimed is:

1. In a method for preparing a polyvinyl alcohol fiber which comprises:
   1. wet-spinning an aqueous spinning solution of polyvinyl alcohol containing boric acid or a borate into an alkaline coagulating bath;
   2. roller drawing the resulting fiber;
   3. neutralizing the resulting drawn fiber;
   4. wet hot drawing the fiber produced in Step (3);
   5. washing the wet hot drawn fiber with water; and
   6. dry hot drawing the water-washed fiber,
   the improvement comprising improving the spinnability of said spinning solution and producing a polyvinyl alcohol fiber having improved tenacity and initial modulus by wet-spinning an aqueous spinning solution which consists essentially of, in addition to said polyvinyl alcohol and said boric acid or borate, from 0.01 to 5 weight percent, based on the weight of said polyvinyl alcohol, of an amino acid.

2. The method as defined by claim 1 wherein said polyvinyl alcohol has a degree of polymerization greater than 500 and a degree of saponification of greater than 95 mole percent.

3. The method as defined by claim 1 wherein the concentration, in said spinning solution, of said polyvinyl alcohol is from 10 to 30 percent by weight, wherein the concentration, in said spinning solution, of said boric acid or said borate is from 0.5 to 5 percent by weight, and wherein the pH of said spinning solution is from 3.5 to 7.

4. The method as defined by claim 3 wherein said alkaline coagulating bath comprises an aqueous solution containing from 5 to 200 g/l of caustic alkali and from 100 g/l to the saturating concentration of a dehydration salt.

5. The method as defined by claim 4 wherein said caustic alkali is selected from the group consisting of sodium hydroxide and potassium hydroxide, and wherein said dehydration salt is selected from the group consisting of sodium sulfate, ammonium sulfate and sodium carbonate.

6. The method as defined by claim 1, wherein said amino acid is an aminopolycarboxylic acid.

7. The method as defined by claim 6, wherein said aminopolycarboxylic acid is selected from the group consisting of ethylenediamine-tetraacetic acid and the sodium and potassium salts thereof, nitrilo-triacetic acid and the sodium and potassium salts thereof, trimethylene diamine-tetraacetic acid and the sodium and potassium salts thereof, methylamine-diacetic acid and the sodium and potassium salts thereof, and N-cyclohexylethylenediamine-triacetic acid and the sodium and potassium salts thereof.

8. The method as defined in claim 1 wherein said amino acid is present in said spinning solution in an amount of from 0.01 to 1.0 percent by weight based on the weight of said polyvinyl alcohol.

* * * * *